A. C. DAVIS & D. L. PRIMROSE.
ANTIGLARE MEANS FOR HEADLIGHTS.
APPLICATION FILED OCT. 9, 1916.
1,217,420.
Patented Feb. 27, 1917.
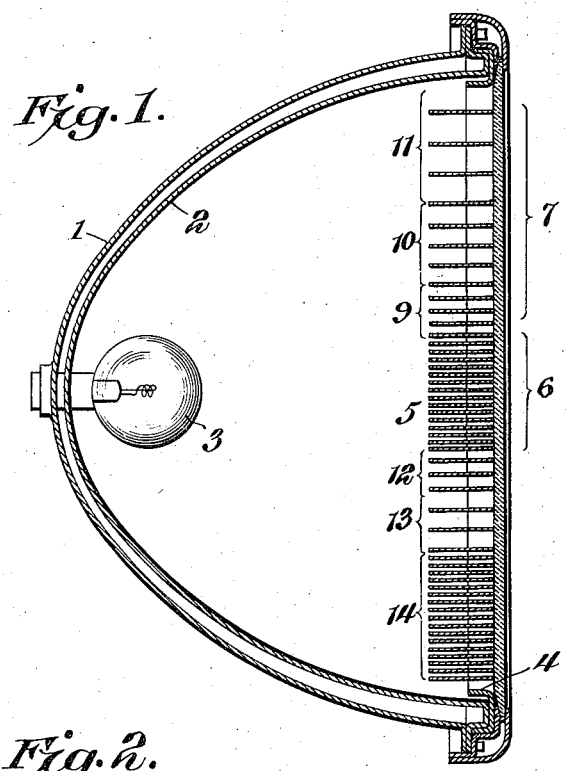
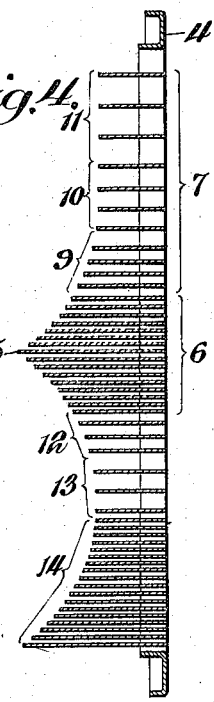
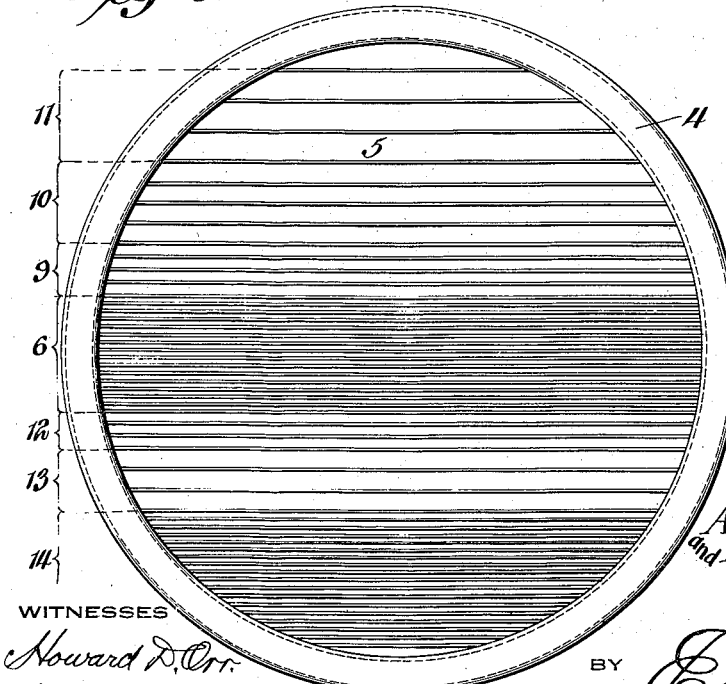
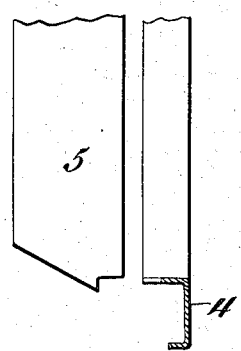
Allan C. Davis
and Donald L. Primrose
INVENTORS,
WITNESSES
Howard D. Orr.
F. T. Chapman.
BY
ATTORNEY

UNITED STATES PATENT OFFICE.

ALLAN CONRADT DAVIS AND DONALD LLOYD PRIMROSE, OF BALTIMORE, MARYLAND.

ANTIGLARE MEANS FOR HEADLIGHTS.

1,217,420. Specification of Letters Patent. Patented Feb. 27, 1917.

Application filed October 9, 1916. Serial No. 124,568.

*To all whom it may concern:*

Be it known that we, ALLAN C. DAVIS and DONALD L. PRIMROSE, citizens of the United States, residing at Baltimore, State of Maryland, have invented a new and useful Antiglare Means for Headlights, of which the following is a specification.

This invention has reference to anti-glare means for headlights, and especially headlights as used for automobiles, and its object is to provide means which may be initially built into headlights or may be applied to already installed headlights, whereby the glare of a high power headlight is completely eliminated so far as other persons toward which the automobile is traveling are concerned, but which will have no noticeable effect with respect to the lighting of the roadway ahead of the automobile.

High power headlights for automobiles are desirable, especially in the case of otherwise unlighted roads, in order that the automobilist may be apprised of conditions sufficiently far in advance to avoid any dangers which may be present. While such high power headlights are highly advantageous and to an extent necessary in giving ample light ahead, the glare produced by such high power headlights as usually constructed is a distinct menace to other automobilists or drivers of vehicles approaching the vehicle with such high power headlights.

Various devices have been proposed for eliminating the glare, some by diffusion and others by devices which either shut off a considerable portion of the light, or direct it immediately in front and but a short distance in advance of the automobile, or temporarily substitute a low power lamp for a high power lamp. All these schemes have the disadvantage of materially cutting down the illumination, especially the illumination far enough in advance of the automobile to effectively protect the automobilist.

In accordance with the present invention the power of the headlight is utilized at all times and with no sensible loss, the illumination of the roadway ahead of the vehicle for the usual distance obtainable with the ordinary high power headlight being present, but to an approaching automobilist the light automatically diminishes in intensity until the headlight apparently goes out, except for the illumination of the roadway. The blinding glare so objectionable with ordinary high power headlights is entirely obliterated and no difficulty is experienced in avoiding on-coming automobiles or in the visible illumination of the roadway alongside of and beyond the on-coming automobile equipped with the present invention.

Automobile headlights are located on the automobile above the roadway by a distance considerably less than the height of the eyes of a pedestrian walking on the same roadway, while the line of vision of a person seated in an automobile is still higher. However, the beam of light emitted by the ordinary automobile headlight of parabolic character is of great intensity to a far greater height than the line of vision of either a pedestrian or the occupant of a vehicle.

By the present invention there is provided at the light emitting end of the headlight a light-controlling means in constantly fixed relation to the headlight, automatically diverting all rays which would rise to the height of the line of vision of on-coming persons so that these rays are so directed as to produce no visible glare and still are utilized for illuminating the roadway far in advance of the automobile equipped with the invention.

To accomplish this the light emitting end of the headlight is provided with a series of parallel laminæ of very thin cross-section extending transversely of the height of the headlight, and so arranged that no light, or at least no glare-producing light, can leave the headlight structure at a height sufficient to be seen by an on-coming observer, whether a pedestrian or an occupant of a vehicle. This requires a peculiar arrangement of the laminæ with relation to each other to overcome the possibility of stray glare-producing beams issuing from the headlight at such an angle as to reach the eyes of the on-coming observer. The structure is susceptible of manufacture as an attachment to existing headlights or may be readily built into headlight structures when manufactured. Moreover, the device permits the use of a much higher candle power in the event of an electric headlight than is permitted by law in some States.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a vertical section through a headlight equipped with the invention and considered as in the usual installed position.

Fig. 2 is a front elevation of the headlight shown in Fig. 1.

Fig. 3 is a detail cross-section of a portion of the supporting ring and one of the laminæ employed in the headlight construction.

Fig. 4 is a section similar to Fig. 1 but showing the supporting ring and laminæ only, and illustrating a construction especially adapted to headlights with deep reflectors.

Referring to the drawings there is shown a shell 1 and parabolic reflector 2 of a prevalent form of headlight equipped with a high power electric lamp 3, such high power lamps being customarily gas filled lamps.

The dimming or light-controlling structure comprises a ring 4 which may be of channel form for strength and lightness, and mounted in this ring is a series of laminæ 5 extending crosswise or in chord relation to the ring, the laminæ being all parallel or substantially parallel one to the other. The laminæ are conveniently made of thin sheet metal, say, of about the gage of ordinary tin plate. One face of each strip 5 of sheet metal may be made highly reflecting as by polishing or by plating with some metal capable of taking high polish, and, therefore, be highly reflective, of which metal nickel may be taken as an example. One face of the laminæ strip is made dull, or non-reflecting, in any suitable manner, this being the face constituting the upper face in the installed position of the structure, the lower face of the laminæ strip being the reflecting face.

It is desirable that the light-controlling structure be of as little depth as may be needed to make the structure effective, and this depth may be relatively small by a proper distribution of the laminæ in an up and down direction in the installed position of the parts. Where the laminæ are directly in front of the electric light bulb, they are placed quite close together and then gradually increase in extent of spacing away from a central zone, which latter is about equal in extent to the diameter of the electric light bulb. Beyond this central zone, in which experience has shown that the laminæ may be spaced about an eighth of an inch apart, the spacing is gradually increased with a corresponding lessening in the number of laminæ, so that in an actual structure found to operate successfully the spacing above the lamp zone increased by one-fourth inch, three-eighths inch and one-half inch, respectively, the widest spacing being adjacent to the top of the headlight body.

Below the central zone where the spacing is narrowest the laminæ are progressively spaced farther and farther apart, which in the actual structure referred to was one-fourth inch, then three-eighths inch, and from such point to the bottom of the headlight casing for a distance about equal to the widening spacing below the central zone, the spacing of the laminæ returned to about that of the central zone, namely, one-eighth of an inch.

It is to be understood that the particular spacing referred to is not obligatory and may vary, such variation usually requiring a corresponding change in the width of the laminæ from front to back of the headlight.

Directly in front and along the horizontal plane of the headlight on a level with the middle of the lamp and for a distance on opposite sides of the middle of the lamp about equal to the diametric height of the lamp bulb, the close spacing of the laminæ strips results in the projection of beams of light in practically horizontal planes. Any material divergence from such horizontal planes results in the striking of the beams of light on the under polished surfaces of the strips and the deflection of such beams of light toward the surface of the roadway, contributing to the illumination thereof and, of course, being entirely out of the direct line of vision of an approaching observer, or one toward which the automobile is approaching, for the line of vision of the observer is higher than the headlight. Since the upper surfaces of the laminæ are dull, that is, are non-reflecting to any noticeable extent, the light which may strike such surfaces is so weakened, because it is mostly absorbed, that all possibility of glare being directed thereby toward the eyes of the observer is prevented.

The light emitted directly by the lamp toward the eye of the observer or any rising beams of light coming from the reflector meet the reflecting under surfaces of the laminæ at such angles as to be reflected toward the roadbed and not toward the eye of the observer. Any beams of light coming from the reflector and at angles which would be liable to be again reflected toward the eye of the observer from the laminæ strike the dull surfaces thereof and so are reduced to a harmless point.

The laminæ are increasingly spaced apart in more or less regular progression from the middle zone toward the top of the headlight because the beams of light progressing at rising angles, become more and more divergent one from the other, so that the light cannot escape from the headlight except straight ahead, or in a downward direction due to reflection from the under faces of the laminæ. The increasing angle of divergence permits a like increase in the spacing apart and a like decrease in the number of laminæ from the central zone upwardly, thus giving a more and more free escape for the light toward the top of the headlight without, however, a chance of the beams other than substantially horizontal beams issuing from the headlight, it being understood, of course, that the installed headlight has its longitudinal axis substantially horizontal.

The reflectors of automobile headlights are ostensibly parabolic reflectors, but in fact their form is often quite far removed from that of a true parabola.

The laminæ located above the central zone of the headlight prevent the escape of any rising rays of light, but do not prevent the escape of many rays of light directed downwardly. This, however, is not objectionable, for it is really advantageous, since such rays of light help to illuminate the roadway without any possibility of their producing observable glares. However, the light reflected from the bottom portion of the headlight reflector are in large part rising rays of light at a small angle to the horizontal, but with an angle sufficient to find direct escape through widened spacing of the laminæ such as is employed at the top portion of the headlight front. Experience has shown that if the same spacing be employed at the bottom of the headlight front as is employed at the top, a very obtrusive glare is produced, and hence the laminæ in the bottom portion at the front of the headlight are brought closer together than they are immediately below the central zone, so that the slightly rising rays of light coming from the headlight reflector are unable to escape directly from the front of the headlight and engage either the under reflecting surfaces of the laminæ to be redirected toward the roadbed, or their glare producing qualities are obliterated by the dull upper surfaces of the laminæ.

The laminæ strips are so disposed both in spacing and width that some portion interposes in the path of the glare producing rays, whereby such rays are either diverted toward the roadbed or their glare producing characteristics are obliterated.

The interference of the device with the illuminating qualities of the headlight is so small as to be unapparent to the ordinary observer, wherefore there is no sensible difference so far as the illumination ahead of the automobile is concerned as between a headlight with the invention applied or an exactly similar headlight with the invention omitted.

The effect upon an observer in front of the automobile is, however, very noticeable. If the approaching automobile be so far away from the observer, say, a thousand or more feet, that the angle between the emitted light and the horiontal is almost inappreciable, glare will be observed, but before the automobile can approach the observer close enough for the glare to be obtrusive the laminæ begin to interpose because of the increasing angle to the horizontal of the emitted rays of light which might reach the eye of the observer, the glare quickly disappears, and so far as the observer is concerned the headlights appear to go out and give no more light and even less light to the eyes of the observer than appears when small lamps are substituted for the high power lamps employed in powerful headlights. However, the roadway in front of the approaching automobile is as well illuminated as before and the approaching automobile is quite visible from light reflected toward it from the roadway, while the eyes of the observer are not blinded by any brilliant lights. If the observer be in an automobile equipped with the present invention the strong road illumination permits the observer to see clearly past the on-coming automobile whereby accidents of any kind need not occur.

It is apparent that the location of opaque devices in the light emitting end of the headlight cuts off some of the light, the amount of such cut off light corresponding to the cross-sectional area of the opaque material in a plane perpendicular to the direction of the emitted rays. For this reason the laminæ are made very thin and the reflecting qualities of the laminæ are utilized. Under these circumstances it becomes necessary to space the laminæ apart in an up and down direction about in accordance with the varying angles of the emitted rays of light to the horizontal, this being especially the case above the horizontal diametric plane of the headlight. The same rule follows below such horizontal central plane except that for the zone close to the bottom of the headlight the narrow spacing of the central zone must be resorted to, this being in a measure due to the departure of commercial forms of parabolic reflectors from true parabolic form and the improper focusing of the lamp. Because of the very small change in angle within a zone about equal to the diameter of the lamp bulb the spacing of the laminæ at the central zone is close and with the great majority of comparatively shallow headlights a spacing approximating that stated is found to be particularly efficient. On either side, that is, either immediately above or immediately below the central zone in close spacing, the spacing of the laminæ may increase progressively about in proportion to the increasing angular relation of the emitted rays to the central horizontal plane of the headlight. Above the central zone the spacing may progressively increase to the top of the headlight, while at the lower portion of the headlight front the spacing returns to approximately that required for the central zone.

With deep reflectors the same general spacing of the laminæ answers, but it is found that the width of the laminæ must be greater at the central zone than near the top of the headlight front with such width increasing progressively to a central point, then decreasing in like progression below the central point throughout the zone of increasing spacing of the laminæ and then where the spacing returns to that of the central zone the width of the laminæ must again progressively increase.

In Figs. 1 and 2 there is shown a central zone 6 where the minimum spacing occurs and another zone 7 above the zone 6 where the spacing may progressively increase until the top of the headlight front is reached. This progressive increase need not be precisely regular, but for convenience the progress may be by sections. For instance, within the space 9 in Figs. 1 and 2 the laminæ may be spaced apart by a distance about twice that of the spacing in the zone 6. In the section 10 of Figs. 1 and 2 the spacing may be three times that of the zone 6 and in the section 11 of Figs. 1 and 2 the spacing may be four times that of the zone 6. Below the zone 6 there are sections 12 and 13 corresponding in spacing to the sections 9 and 10, while in the lowermost section 14 which may be approximately equal to the combined sections 12 and 13, the spacing returns to that of the zone 6.

In Fig. 4 the same general arrangement as shown in Figs. 1 and 2 so far as spacing is concerned, occurs, but from and including the upper limits of the section 9, through the zone 6 and through the sections 12 and 13 the width of the laminæ gradually increases to the mid point of the light-controlling device indicated at 15, and then gradually decreases until in the section 13 the width is about the same as in the sections 10 and 11. In the section 14, however, the width of the sections gradually increases toward the bottom of the headlight.

What is claimed is:—

1. Anti-glare means for headlights of vehicles and the like, comprising a series of thin plates arranged horizontally in the light emitting end of the headlight with respect to the installed position of the headlight, the plates being spaced apart in the direction of the height of the headlight with those plates opposite the light giving element of the headlight and at the lower portion of the light emitting opening relatively close together, and the remainder of the plates on both sides of the plates in line with the light giving element increasing in spacing in a direction away from the horizontal central zone of the headlight.

2. Means for preventing glare in headlights of automobiles and the like, comprising a series of substantially parallel thin plates arranged horizontally with respect to the installed position of the headlight, said plates being spaced apart by distances to prevent direct view of any brilliantly illuminated portion of the headlight by an observer having the line of vision higher than the top of the headlight when the latter is directing the light rays horizontally, the spacing between the plates being least in a central zone opposite the light giving element of the headlight and at the bottom portion of the headlight, and the spacing increasing between those plates from the central zone to the top of the headlight and from the central zone for a portion of the distance toward the bottom of the headlight.

3. Means for preventing glare in headlights of automobiles and the like, comprising a series of substantially parallel thin plates arranged horizontally with respect to the installed position of the headlight, said plates being spaced apart by distances to prevent direct view of any brilliantly illuminated portion of the headlight by an observer having the line of vision higher than the top of the headlight when the latter is directing the light rays horizontally, the spacing between the plates being least in a central zone opposite the light giving element of the headlight and at the bottom portion of the headlight, and the spacing increasing between those plates from the central zone to the top of the headlight and from the central zone for a portion of the distance toward the bottom of the headlight, the increase in spacing of the plates being approximately in accordance with the increase in angle to the horizontal of the rays ordinarily directed toward the eye of the observer from the source of illumination and from the reflector within the headlight.

4. Means for preventing glare in automobile and other headlights comprising a ring-like member adapted to the light emitting end of the headlight and a series of substantially parallel plates carried by the ring, said plates varying in spacing and being of a width to prevent direct vision of the source of light or of glare producing portions of the headlight reflector by an observer having the eyes higher than the headlight with the latter substantially horizontal, the plates being spaced apart in the direction of the height of the installed headlight to different extents progressively increasing above the central portion of the headlight toward the top thereof.

5. Means for preventing glare in automobile and other headlights comprising a ring-like member adapted to the light emitting end of the headlight, and a series of substantially parallel plates carried by the ring, said plates varying in spacing and being of a width to prevent direct vision of the source of light or of glare producing portions of the headlight reflector by an observer having the eyes higher than the headlight with the latter substantially horizontal, the plates being spaced apart in the direction of the height of the installed headlight to different extents progressively increasing above the central portion of the headlight toward the top thereof, the spacing of the plates also increasing from the central portion of the headlight for a part of the distance toward the bottom thereof.

6. An anti-glare attachment for headlights of automobiles and other structures, comprising a ring adapted to be lodged in the light emitting end of the headlight, with said ring provided with a series of parallel plates extending across the ring in substantially chord relation thereto, said plates being spaced apart to varying extents, with the spacing close at the central portion of the series and at one end thereof, and increasing from the central portion, the spacing gradually widening from the central portion to that end of the series remote from the first-named end.

7. An anti-glare attachment for headlights of automobiles and other structures, comprising a ring adapted to be lodged in the light emitting end of the headlight with said ring provided with a series of parallel plates extending across the ring in substantially chord relation thereto, said plates being spaced apart to varying extents, with the spacing close at the central portion of the series and at one end thereof, and increasing from the central portion, the spacing gradually widening from the central portion to that end of the series remote from the first-named end, said plates having the surface constituting the under surface in the installed position of the device highly reflective and the opposite surface dull.

In testimony, that we claim the foregoing as our own, we have hereto affixed our signatures in the presence of two witnesses.

ALLAN CONRADT DAVIS.
DONALD LLOYD PRIMROSE.

Witnesses:
J. MILTON DAVIS,
CHAS. SHERWOOD LONG.